United States Patent
Matsushiro et al.

(10) Patent No.: US 6,356,364 B2
(45) Date of Patent: Mar. 12, 2002

(54) COLOR CORRECTING APPARATUS

(75) Inventors: Nobuhito Matsushiro; Yasushi Kobayashi; Noriharu Fujiwara, all of Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/794,111

(22) Filed: Feb. 28, 2001

(30) Foreign Application Priority Data

Mar. 2, 2000 (JP) ............................................. 12-057717
Feb. 19, 2001 (JP) ............................................. 12-041205

(51) Int. Cl.⁷ ............................................. G06K 15/00
(52) U.S. Cl. ......................................... 358/1.9; 358/1.1
(58) Field of Search ......................... 358/1.1, 1.9, 1.4, 358/298, 302, 455, 456, 458, 504, 515, 518, 523, 527; 347/171, 172, 173, 183, 188, 104; 503/227; 382/167; 355/35, 38, 77

(56) References Cited

U.S. PATENT DOCUMENTS 5,929,889 A * 7/1999 Narita et al. ................. 347/171
5,987,222 A * 11/1999 Terashita .................... 358/1.9

* cited by examiner

Primary Examiner—Arthur G. Evans
(74) Attorney, Agent, or Firm—Rabin & Berdo, P.C.

(57) ABSTRACT

A color correcting apparatus corrects color data according to second ambient light so that an output device outputting a color based on the color data calibrated in first specified ambient light can output almost the same color in the second light. The apparatus comprises a storing section used to store several main component data each representing a different component of light, which are combined to reproduce the second light, an input section used to input several weighing coefficients to assign weight to each of the several pieces of component data when they are combined and a correcting section used to correct color data based on correction parameters obtained using the several pieces of component data stored in the storing section and using the several weighing coefficients input through the input section.

13 Claims, 16 Drawing Sheets

Fig.15

$$X_n' = X_n \frac{X_{D50}}{X_A}, \quad Y_n' = Y_n \frac{Y_{D50}}{Y_A}, \quad Z_n' = Z_n \frac{Z_{D50}}{Z_A} \quad (1)$$

$$M = \begin{pmatrix} X_r & X_g & X_b \\ Y_r & Y_g & Y_b \\ Z_r & Z_g & Z_b \end{pmatrix} \quad (2)$$

$$\begin{pmatrix} X_{bs} \\ Y_{bs} \\ Z_{bs} \end{pmatrix} = M \begin{pmatrix} (R_{bs}/255)^{\gamma r} \\ (G_{bs}/255)^{\gamma g} \\ (B_{bs}/255)^{\gamma b} \end{pmatrix} \quad (3)$$

$$\begin{aligned} X_{out} &= X_{bs} - \text{Ref} \times X_s \\ Y_{out} &= Y_{bs} - \text{Ref} \times Y_s \\ Z_{out} &= Z_{bs} - \text{Ref} \times Z_s \end{aligned} \quad (4)$$

$$\begin{aligned} R_{out} &= 255 \times R_{out}'^{\frac{1}{\gamma r}} \\ G_{out} &= 255 \times G_{out}'^{\frac{1}{\gamma g}} \\ B_{out} &= 255 \times B_{out}'^{\frac{1}{\gamma b}} \end{aligned}$$

$$\begin{pmatrix} R_{out}' \\ G_{out}' \\ B_{out}' \end{pmatrix} = M^{-1} \begin{pmatrix} X_{out} \\ Y_{out} \\ Z_{out} \end{pmatrix} \quad (5)$$

$$s(\lambda) = t1 \times ts1(\lambda) + t2 \times ts2(\lambda) + t3 \times ts3(\lambda) \quad (6)$$

Fig. 16

| | |
|---|---|
| $X'' = X_{out} (X_m/X_s)$ <br> $Y'' = Y_{out} (Y_m/Y_s)$ <br> $Z'' = Z_{out} (Z_m/Z_s)$ | (7) |
| $X_t = X_{bs} + X_{add}$ <br> $Y_t = Y_{bs} + Y_{add}$ <br> $Z_t = Z_{bs} + Z_{add}$ | (8) |
| $X_s' = X_s - X_{add}$ <br> $Y_s' = Y_s - Y_{add}$ <br> $Z_s' = Z_s - Z_{add}$ | (9) |
| $X'' = X_{out} (X_m/X_s')$ <br> $Y'' = Y_{out} (Y_m/Y_s')$ <br> $Z'' = Z_{out} (Z_m/Z_s')$ | (10) |
| $X_s = \sum_\lambda S(\lambda)\bar{x}(\lambda)$ <br><br> $Y_s = \sum_\lambda S(\lambda)\bar{y}(\lambda)$ <br><br> $Z_s = \sum_\lambda S(\lambda)\bar{z}(\lambda)$ <br><br> $\bar{x}, \bar{y}, \bar{z}$ DENOTES COLOR MATCHING FUNCTIONS | (11) |

COLOR CORRECTING APPARATUS

BACKGROUND OF THE INVENTION

1. Field of the Invention

The present invention relates to a color correcting apparatus used to correct a color to be output to an output device in response to ambient light.

2. Description of the Related Art

FIG. 1 is a schematic block diagram showing configurations of a conventional image processing device. The conventional image processing device is provided with a computer 40, a monitor 50 and a printer 60. In the conventional image processing device, the monitor 50 displays an image to be printed on the printer 60 and the printer 60 prints the image displayed on the monitor 50. Specifically, a user who operates the monitor 50 and printer 60 edits the image to be printed while watching the image being displayed on the monitor 50 and, after having checked the image displayed on the monitor 50, prints the image that has been edited on the printer 60.

Since the monitor 50 is configured to express a color using a process of additive mixture of color stimuli composed of three colors RGB (Red, Green and Blue), that is, displaying color data defining the color of the displayed image is represented by a RGB calorimetric system. On the other hand, the printer 60 is configured to express a color using a process of subtractive mixture of color stimuli composed of three colors CMY (Cyan, Magenta and Blue), that is, printing color data defining the color of the printed image is represented by a CMY colorimetric system. Therefore, conversions between the displaying color data and the printing color data are required. To achieve this, the conventional image processing device is provided with an RGB-XYZ converting section 62 to make conversions between the RGB colorimetric system and XYZ calorimetric system and with an XYZ-CMY converting section 66 to make conversions between the XYZ colorimetric system and the CMY colorimetric system.

Moreover, the color to be displayed by the monitor 50 varies depending on color reproduction characteristics of the monitor 50, while the color to be printed by the printer 60 varies depending on the color reproduction characteristics of the printer 60. The image processing device stores a monitor profile 61 obtained on the basis of the color reproduction characteristics of the monitor 50 which shows a relation between the color defined by the image color data that is input to the monitor 50 and the color that can be displayed actually by the monitor 50 and a printer profile 65 obtained on the basis of the color reproduction characteristics of the printer 60 which shows a relation between the color defined by the image color data that is input to the printer 60 and the color that can be printed actually by the printer 60. The image processing device corrects displaying color data that has been input to the monitor 50 according to the above monitor profile 61 and further printing color data which is the displaying color data that has been corrected according to the above printer profile 65 and then the printer 60 prints the color defined by the corrected printing color data.

In the image processing device, the RGB-XYZ converting section 62 converts the displaying color data (R, G and B) output from a RGB signal storing section 43 to CIE (Commission Internationale de l'echlairage) CYZ values (X, Y and Z) according to the monitor profile 61. Then an illuminant converting section 64 makes illuminant conversions of the above CIE XYZ values (X, Y and Z) and outputs the CIE XYZ values (X', Y' and Z') obtained by having made illuminant conversions. Moreover, the XYZ-CMY converting section 66 converts the CIE XYZ values (X', Y' and Z') output from the illuminant converting section 64 to printing color data (C, M and Y) according to the printer profile 65. The printer 60 prints the color based on the printing color data (C, M, Y).

The above printer profile 65 is created in the ambient light from a specified illuminant. Therefore, if the printer profile 65 has been created in the ambient light produced by using, for example, an illuminant D50, while the monitor 50 and the printer 60 are put in the ambient light produced by using any illuminant other than the illuminant D50, even if the printer profile 65 is used as it is, the printed color looks differently from its original one because the different two illuminants have been employed.

To solve this problem, in the conventional image processing device, an observation ambient illuminant information storing section 42 stores illuminant data that can correspond to a plurality of illuminants including, for example, a D50 illuminant, A illuminant, D65 illuminant, each having a different wavelength distribution, and an observation ambient illuminant information selecting section 41, in response to information, given by a user, about the illuminant producing the ambient light in which the monitor 50 and the printer 60 are put, selects best-suited illuminant data from two or more pieces of the illuminant data stored in the observation ambient illuminant information storing section 42 and outputs the selected illuminant data to the illuminant converting section 64. The illuminant converting section 64 makes illuminant conversions based on correction data calculated from the illuminant producing the ambient light in which the monitor 50 and the printer 60 are put and from the illuminant producing the ambient light used when the printer profile 65 has been created.

When the user who is putting the monitor 50 and the printer 60 in the ambient light produced by, for example, the A illuminant, inputs information requiring the A illuminant, the observation ambient illuminant information selecting section 41 selects A illuminant data XA, YA and ZA that can correspond to the information input by the user from the observation ambient illuminant information storing section 42 and outputs the selected illuminant data XA, YA and ZA to the illuminant converting section 64.

The printer 60, by using D50 illuminant data XD50, YD50, ZD50 that produces the ambient light used when the printer profile 65 is created, which is stored in a colorimetry illuminant information storing section 63, and the A illuminant data XA, YA and ZA that produces the ambient light in which the monitor 50 and the printer 60 are put, which has been fed from the observation ambient illuminant information selecting section 41, calculates correction data (X', Y' and X') using the equation (1) in FIG. 15 and calibrates the printing color data based on the obtained correction data (X', Y' and X').

However, the conventional image processing device has the following problem. That is, even when the printing color data is corrected by using the correction data (X', Y' and X') calculated using the above equation (1) based on the illuminant producing the ambient light used when the profile 65 of the printer 60 has been created and on the illuminant producing the ambient light in which the monitor 50 and the printer 60 are actually put, since the ambient light in which the monitor 50 and the printer 60 are put contains light emitted from two or more kinds of illuminants, the color printed on the printer 60 looks differently from its original one due to an influence by light emitted from the two or more kinds of the illuminants. That is, there is the problem that the conventional image processing device cannot reproduce faithfully the original color. In addition, since the printer working as the output device is affected by the ambient light, there is the problem that the printer cannot reproduce the original color faithfully as well.

SUMMARY OF THE INVENTION

In view of the above, it is an object of the present invention to provide a color correcting apparatus capable of more faithfully reproducing an original color to be output from an output device.

According to an aspect of the present invention, there is provided a color correcting apparatus that, in order to allow an output device that outputs a first color based on first color data calibrated to output the first color in first ambient light, to output a second color substantially the same as the first color in second ambient light having wavelength distribution or chromaticity coordinates different from that of the first ambient light, corrects the first color data according to the second ambient light, the color correcting apparatus comprising: a storing section used to store two or more pieces of main component data each representing a different component of light, the main component data being combined to reproduce the second ambient light; an input section used to input two or more weighing coefficients to assign weight to each of the two or more pieces of component data when the two or more pieces of main component data are combined; and a correcting section used to correct the first color data based on correction parameters obtained using the two or more pieces of component data stored in the storing section and using the two or more weighing coefficients input through the input section.

It is preferable that correction parameters providing achromatic color displaying are employed for the color correction in color display based on achromatic color data using the correction parameters in the second ambient light. It is further preferable that the achromatic color data is chromatic color data having a hue.

It is preferable that the main component is a representative light component obtained by analysis and synthesis of two or more kinds of ambient light each being different from each other. It is further preferable that the main component data represents wavelength distribution of light obtained by the synthesis of the two or more kinds of ambient light.

It is preferable that the color correcting apparatus further comprises a displaying section used to display a color based on the color data corrected by the correcting section in order to obtain the correction parameters required for correcting the second ambient light. It is further preferable that the displaying section is a section on which a color is displayed by either a RGB (Red, Green and Blue) colorimetric system or a CMY (Cyan, Magenta and Yellow) colorimetric system. It is still further preferable that the displaying section in which a color is displayed by the RGB calorimetric system is a monitor and the displaying section in which the color is displayed by the CMY calorimetric system is a printer.

It is preferable that the displaying section is either the displaying section using a process of additive mixture of color stimuli or the displaying section using a process of subtractive mixture of color stimuli.

It is preferable that the output device is a displaying section on which a color is displayed by either the RGB calorimetric system or the CMY colorimetric system. It is further preferable that the displaying section in which a color is displayed by the RGB calorimetric system is a monitor and the displaying section in which the color is displayed by the CMY colorimetric system is a printer.

It is preferable that the color correcting apparatus further comprises a calibrating section used to calibrate a color based on the color data corrected by the correcting section in order to obtain the correction parameters required for correcting the second ambient light.

It is preferable that the output device is the output device using a process of additive mixture of color stimuli or the output device using a process of subtractive mixture of color stimuli.

BRIEF DESCRIPTION OF THE DRAWINGS

The above and other objects, advantages and features of the present invention will be more apparent from the following description taken in conjunction with the accompanying drawings in which:

FIGS. 15 and 16 shows equations to be used for correction of colors used in the first and second embodiment of the present invention.

DESCRIPTION OF THE PREFERRED EMBODIMENTS

Best modes of carrying out the present invention will be described in further detail using various embodiments with reference to the accompanying drawings. Specifically, image processing devices of first and second embodiments will be described by referring to equations shown FIGS. 15 and 16.

First Embodiment

Figure 1:
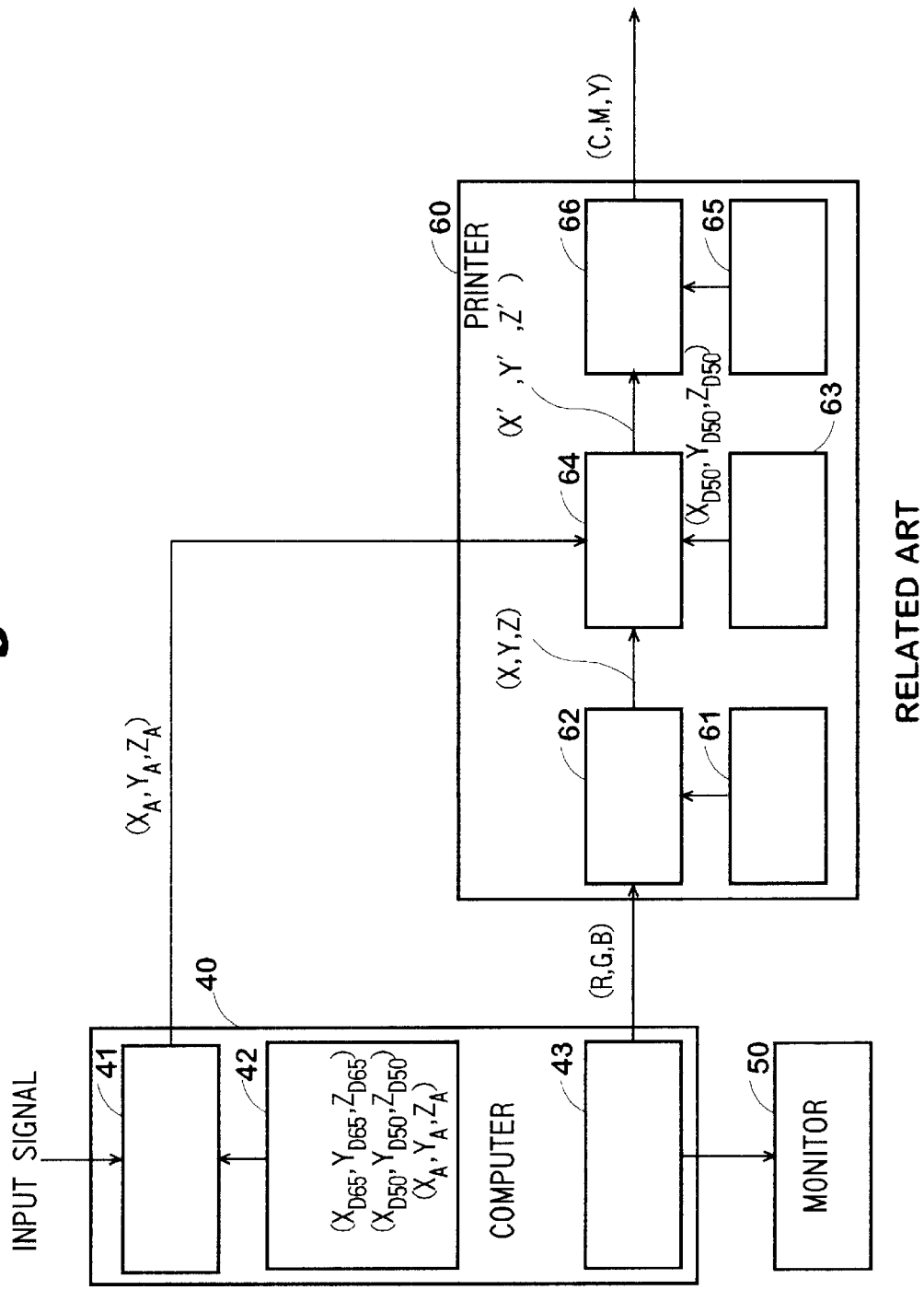
FIG. 1 is a schematic block diagram showing configurations of a conventional image processing device.
Figure 2:
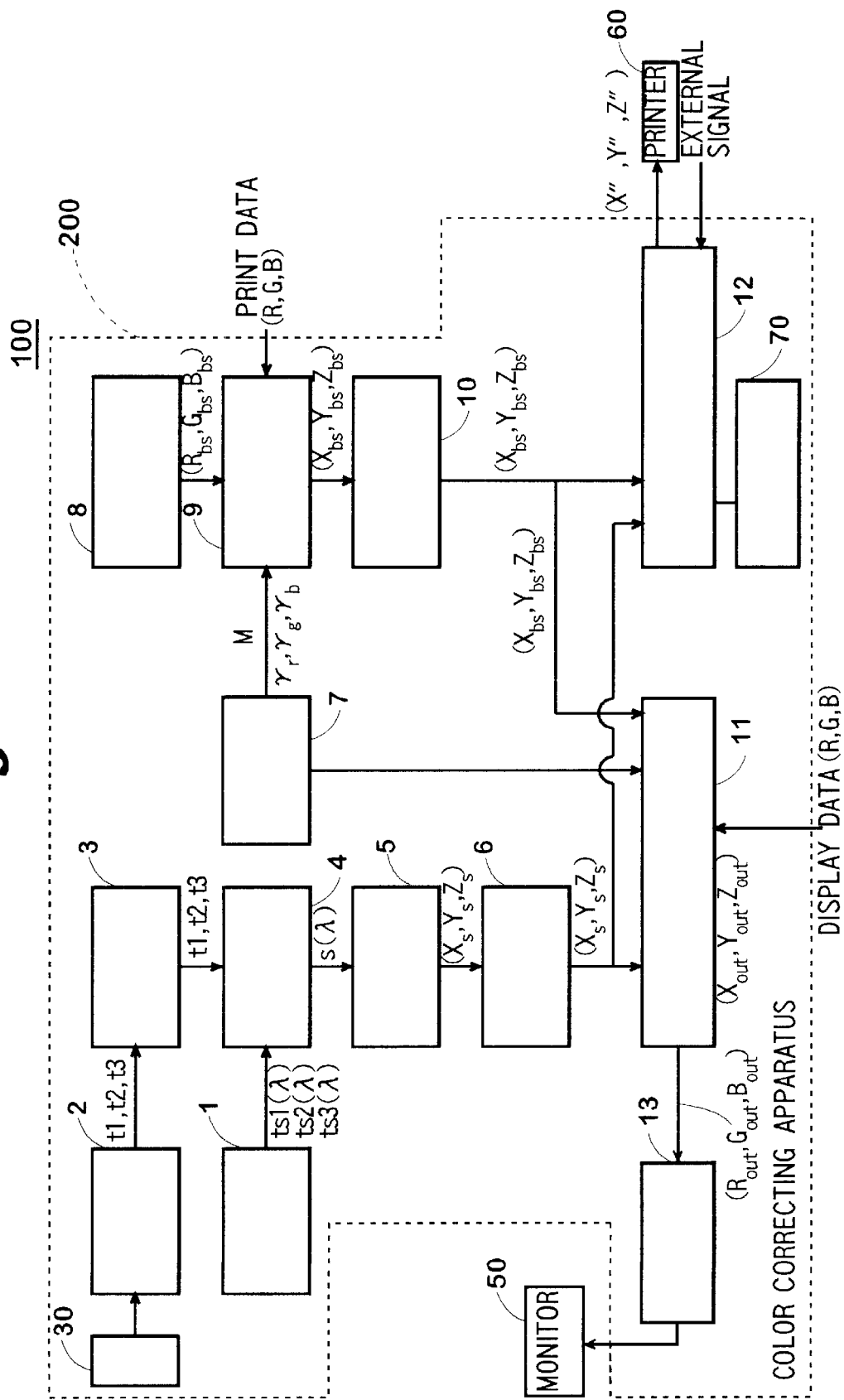
FIG. 2 is a schematic block diagram showing configurations of an image processing device according to a first embodiment of the present invention.

The image processing device of the first embodiment employing a color correcting apparatus of the present invention will be described below. FIG. 2 is a schematic block diagram showing configurations of the image processing device 100 according to the first embodiment. The image processing device 100, as shown in FIG. 2, includes a well-known monitor 50 and printer 60. In the image processing device 100 is embedded the color correcting apparatus 200.

For ease of explanation and comprehension of this invention, it is assumed that the monitor 50 and the printer 60 are placed close to each other, that is, are placed under the same ambient light in both the first embodiment and the second embodiment that will be described later.

The color correcting apparatus 200 is provided with an input section 30, a spectral distribution main-component data storing section 1, a parameter converting section 2, a weighing coefficient storing section 3, a spectral distribution data producing section 4, an estimated XYZ value calculating section 5, an estimated XYZ value storing section 6, a monitor profile storing section 7, a reference achromatic color RGB signal storing section 8, an RGB-XYZ converting section 9, a reference achromatic XYZ value storing section 10, a displaying RGB signal calculating section 11, an observation ambient illuminant chromaticity calculating section 12, a monitor reproduced color updating section 13 and a printer profile storing section 70.

The input section 30 is, for example, a keyboard and/or a mouse which are used by a user to input an instruction and data required for image processing. The spectral distribution main-component data storing section 1 is a storing section used to store two or more pieces of main-component data (ts1($\lambda$), ts2($\lambda$) and ts3($\lambda$))showing components of light emitted from representative or general illuminants that are contained in ambient light to be described later. The spectral distribution main-component data storing section 1 stores light components representing superimposed wavelength distribution of light emitted from general two or more illuminants, that is, three light components including a first main component, second main component and third main component, which have been obtained from a well-known analysis on main components. In the analysis on main components of light, a main component axis is determined based on dispersion values of the main components. In the first embodiment, the light component axis having the dispersion value being the maximum is defined as a first main component, the light component axis having the dispersion value being the largest next to the dispersion value of the light component axis defined as the first main component is defined as a second main component and a light component axis having the dispersion value being the largest next to the dispersion value of the light component axis defined as the second main component is defined a third main component.

The first main component is typically representative of the superposed wavelength distribution of light emitted from the general two or more illuminants, the second main component is typically representative of the above wavelength distribution next to the first main component and the third main component is typically representative of the above wavelength distribution next to the second main component. Since these main components are those commonly extracted from light emitted from the above general two or more illuminants, by combining these main components, more exactly, by most suitably calibrating weight assigned to the main components before the combination, the wavelength distribution being most approximate to the wavelength distribution of the ambient light containing light emitted from unknown two or more illuminants can be obtained.

Figure 3:
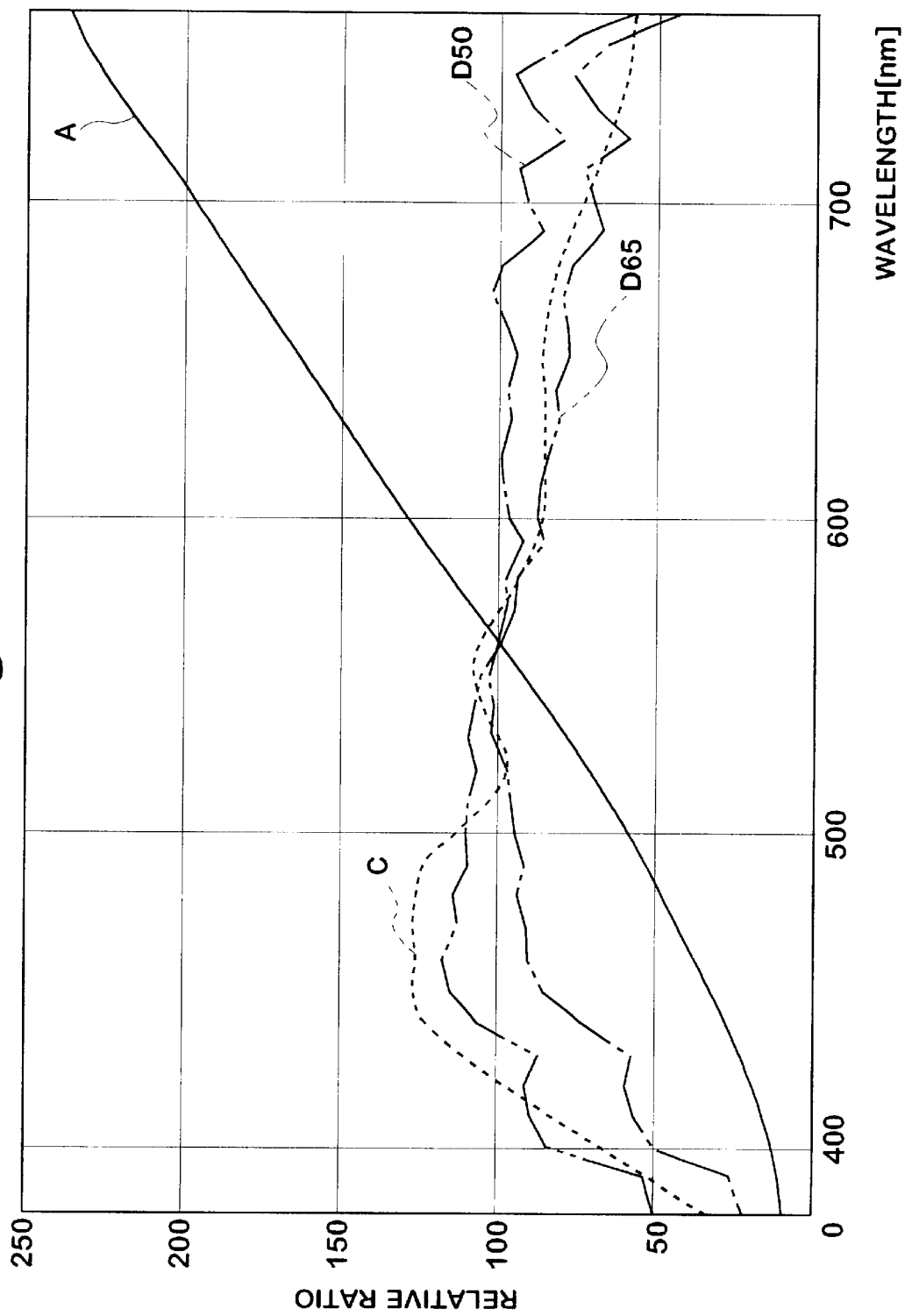
FIG. 3 shows wavelength distribution of light from representative illuminants employed in the first embodiment of the present invention.
Figure 4:
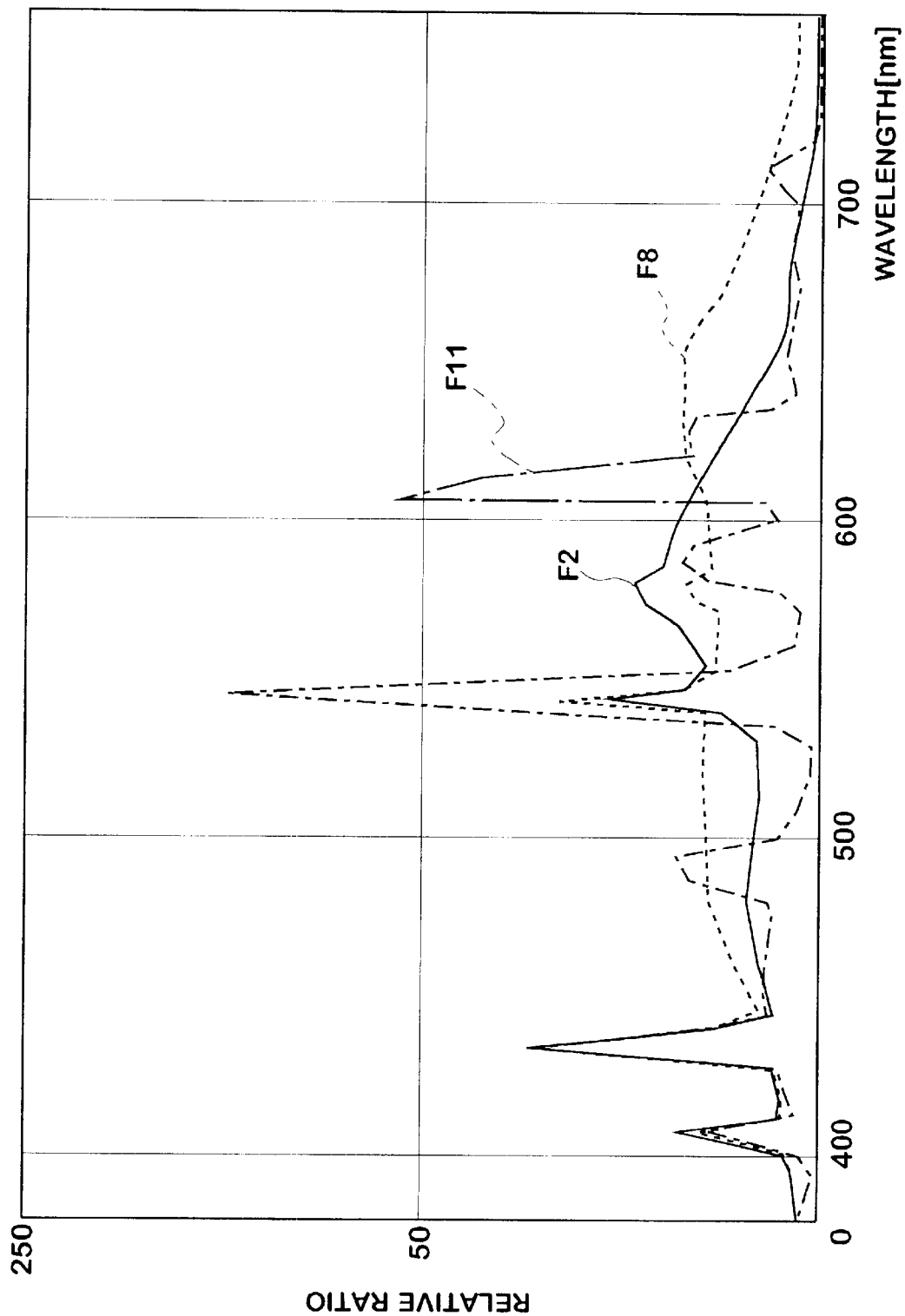
FIG. 4 also shows wavelength distribution of light from representative illuminants employed in the first embodiment of the present invention.
Figure 5:
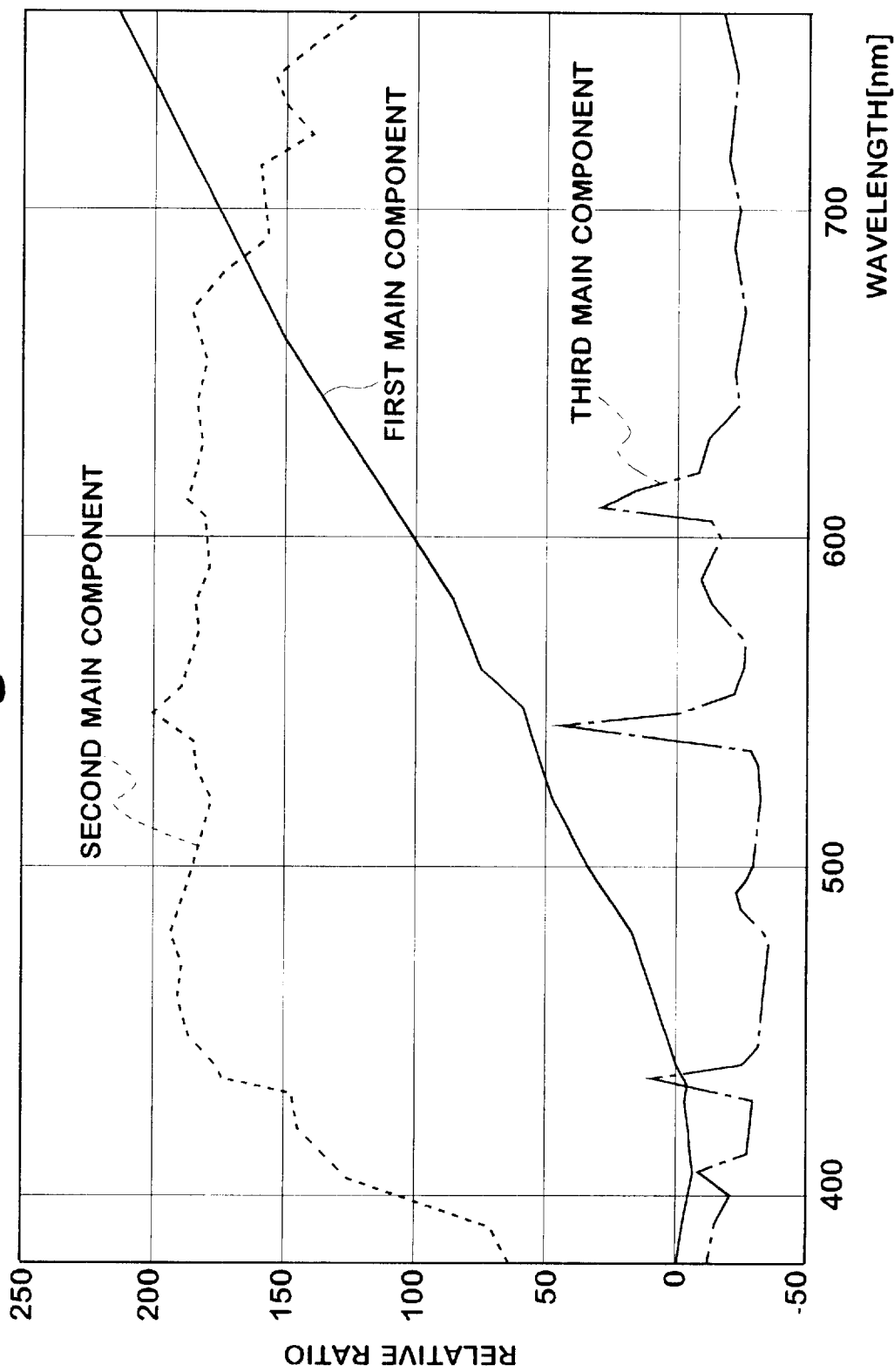
FIG. 5 shows wavelength distribution of a main component to a third component of light from an illuminant employed in the first embodiment of the present invention.

FIGS. 3 and 4 show wavelength distribution of light emitted from representative illuminants and FIG. 5 shows wavelength distribution of a main component to a third component. The representative and general illuminants, as shown in FIGS. 3 and 4, includes 7 kinds of illuminants: A, D50, D65, C, F2, F8 and F11 illuminants. The light emitted from each of these illuminants exhibits the wavelength distribution as shown in FIGS. 3 and 4 and the first main component to third main components shown in FIG. 5 can produce the wavelength distribution being approximate to the wavelength distribution of the synthetic light containing light from the 7 kinds of the illuminants by synthesis of these main components.

The spectral distribution main-component data storing section 1 stores the main component data ts1($\lambda$), ts2($\lambda$)and ts3($\lambda$)showing the wavelength distribution of the first to third main components in the wavelength band of, for example, 380 nm to 760 nm, by the relative ratio. The symbol ($\lambda$)represents the wavelength in a range of 380 nm <$\lambda$<760 nm.

The number of the main components is not limited to the three described above and it is desirable that the number be larger. Moreover, the number of the illuminants being an object of the analysis on the main component is not limited to the seven above described examples, and it is desirable that the number be larger. Furthermore, instead of the main components being obtained from the analysis on the main components described above, a transform coefficient obtained by orthogonal transform including Fourier transform, DCT (Discrete Cosine Transform) or the like may be used.

As shown in FIG. 2, the parameter converting section 2 produces, in accordance with instructions provided by the user via the input section 30, weighing coefficients (t1, t2 and t3) used to assign weight to each of the main component data. The weighing coefficient storing section 3 stores the weighing coefficients (t1, t2 and t3) produced by the parameter converting section 2. The spectral distribution data producing section 4 produces spectral distribution data s($\lambda$) showing wavelength distribution of light emitted from an ambient illuminant that can be estimated based on the weighing coefficients (t1, t2 and t3) stored in the weighing coefficient storing section 3 and in the spectral distribution main-component data storing section 1. The estimated XYZ value calculating section 5 calculates correction parameters (Xs, Ys and Zs) expressed by an XYZ calorimetric system (CIE 1931 standard calorimetric system) from the spectral distribution data s($\lambda$) of the light emitted from the ambient illuminant produced by the spectral distribution data producing section 4. The estimated XYZ value storing section 6 stores correction parameters calculated by the estimated XYZ value calculating section 5.

The monitor profile storing section 7 stores, in advance, the monitor profile obtained on the basis of the well-known color reproduction characteristics of the monitor 50 which shows the relation between the color defined by the image color data that is input to the monitor 50 and the color that can be displayed actually by the monitor 50, while the printer profile storing section 70 stores, in advance, the printer profile obtained on the basis of the well-known color reproduction characteristics of the printer 60 which shows the relation between the color defined by the image color data that is input to the printer 60 and the color that can be printed actually by the printer 60. The monitor profile is represented by gamma coefficients (γr, γg and γb)and by a 3×3 matrix M for spatial mapping and the matrix M is given by the equation (2) in FIG. 15.

The reference achromatic color RGB signal storing section 8 stores reference achromatic signals (Rbs, Gbs and Bbs) which express, by the RGB calorimetric system, an achromatic color, for example, a gray color used to calculate the correction parameters (Xs, Ys and Zs), more exactly, to be used as a judgement reference for determining weighing coefficients. The RGB-XYZ converting section 9 converts the reference achromatic color signals (Rbs, Gbs and Bs) or printing data (R, G and B data) expressed by the RGB system input from outside. The reference achromatic color XYZ value converting section 10 stores reference achromatic color data (Xbs, Ybs and Zbs) obtained from the conversions made by the above RGB-XYZ converting section 9.

The displaying RGB signal calculating section 11 being a correcting section, by using the correction parameters (Xs, Ys and Zs) stored in the estimated XYZ value storing section 6 and the monitor profile stored in the monitor profile storing section 7, corrects data (Xbs, Ybs and Zbs) expressed by the XYZ colorimetric system obtained from the printing data (R, G and B data), which is used to define colors of images to be displayed on the monitor 50, or data (Xbs, Ybs and Zbs) expressed by the XYZ calorimetric system obtained from the reference achromatic color signals, which is also used to define colors of images to be displayed on the monitor 50, and outputs RGB signals (Rout, Gout and Bout) being resulting corrected data to the monitor 50 via the monitor reproduced color updating section 13. This enables the monitor 50 to display the corrected reference achromatic color signal and the corrected printing data. In the present invention, it is of importance, in particular, to display the corrected reference achromatic color signal.

The observation ambient illuminant chromaticity calculating section 12 being a correction section, by using the correction parameters (Xs, Ys and Zs) stored in the estimated XYZ value storing section 6 and the printer profile stored in the printer profile storing section 70, calculates data (X, Y and Z data) which define colors of images to be printed on the printer 60. The printer 60 converts these data (X, Y and Z data) to the data expressed by the CMY colorimetric system and performs printing in accordance with the converted data expressed by the CMY calorimetric system.

Figure 6:
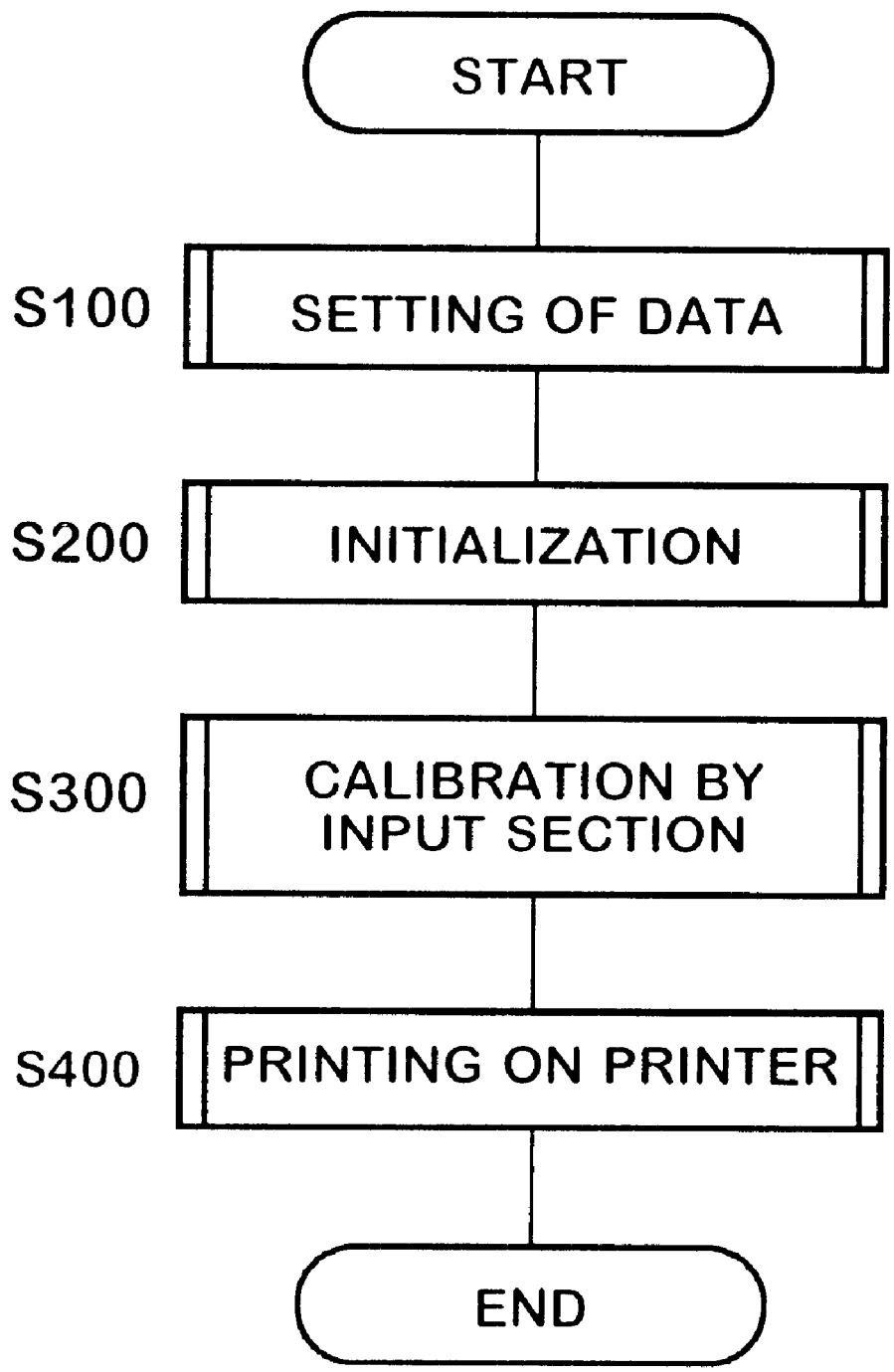
FIG. 6 is a flowchart briefly explaining operations of the image processing device according to the first embodiment of the present invention.

FIG. 6 is a flowchart briefly explaining operations of the image processing device according to the first embodiment of the present invention. To operate the image processing device, as shown in FIG. 6, data is set in Step S100, initialization is performed in Step S200, weighing coefficients are calibrated by the input section 30 in Step S300 and printing is done on the printer 60 in Step S400.

Figure 7:
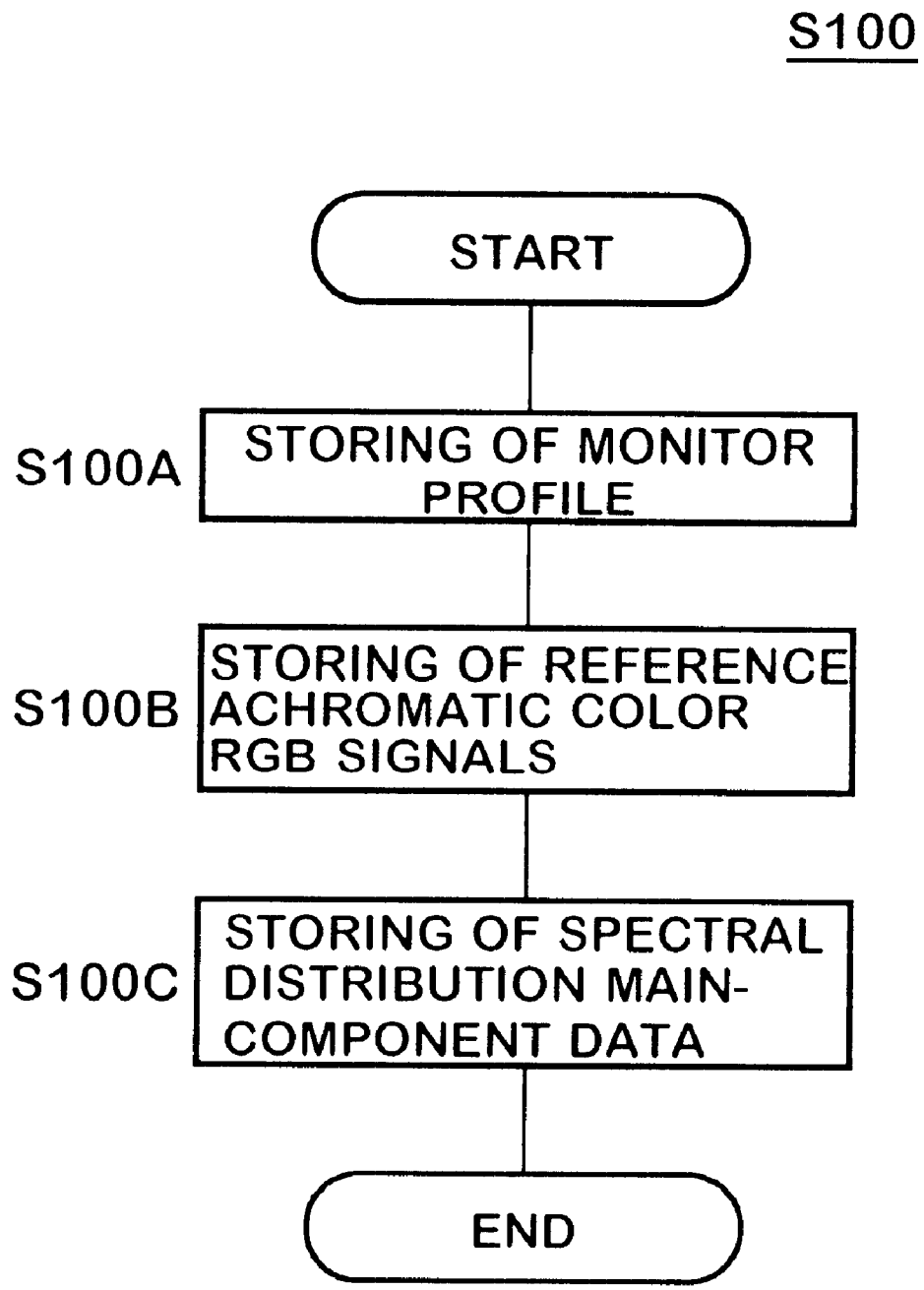
FIG. 7 shows detailed procedures for setting data explained in the flowchart of FIG. 6.

FIG. 7 shows detailed procedures for setting data explained in the flow chart of FIG. 6. The setting of data shown in FIG. 7 is made manually by the user or automatically by a computer (not shown). First, in step S100A as shown in FIG. 7, the monitor profile expressed by the above equation (2) is stored in the monitor profile storing section 7. The printer profile is also stored in the printer profile storing section 70 in the same manner as for the monitor file.

Next, in step S100B, the above reference achromatic color signals (Rbs, Gbs and Bbs) are stored in the reference achromatic color RGB signal storing section 8. In step S100C, the spectral distribution main-component data ts1(λ), ts2(λ)and ts3(λ) are stored in the spectral distribution main-component data storing section 1.

Figure 8:
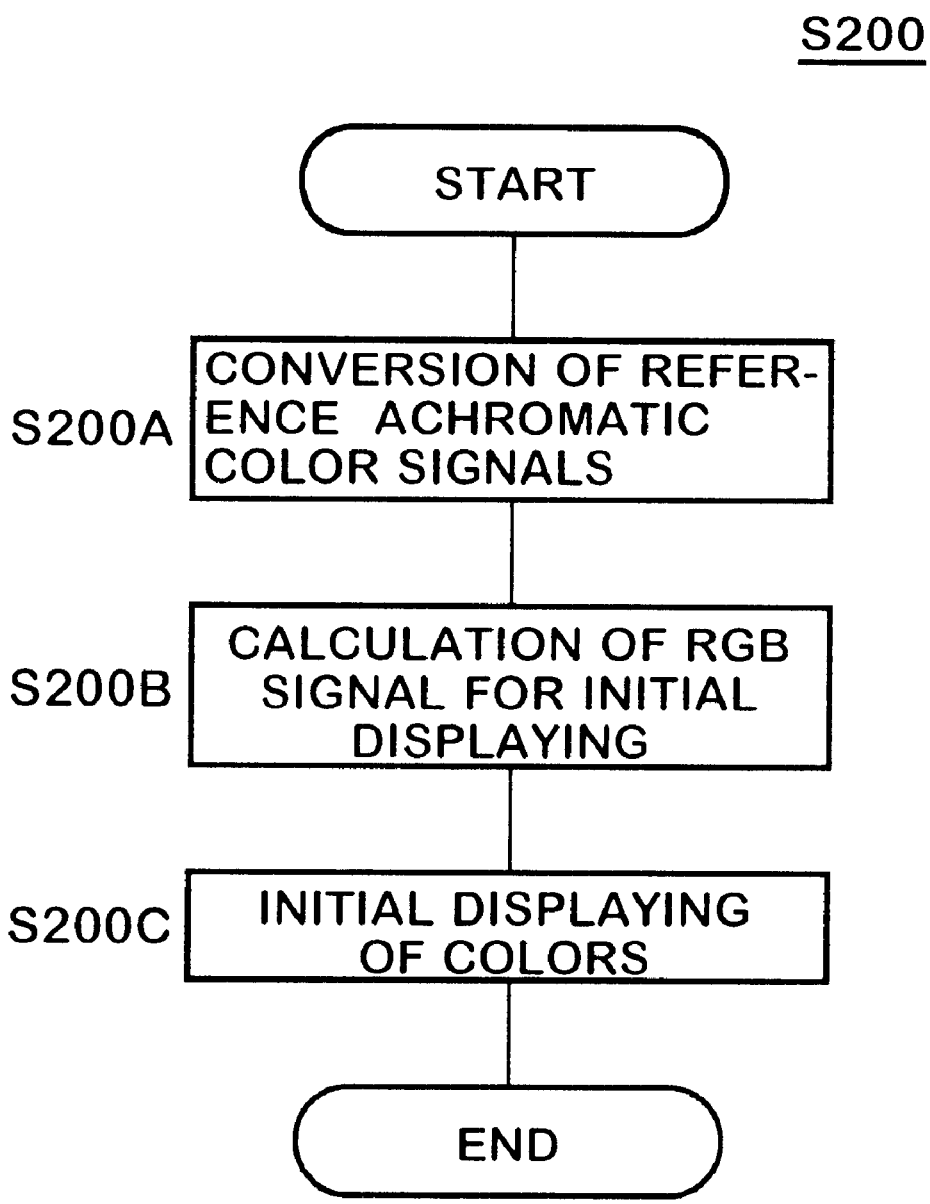
FIG. 8 shows detailed procedures for the initialization explained in the flowchart of FIG. 6.

FIG. 8 shows detailed procedures for the initialization explained in the flow chart of FIG. 6. As shown in FIG. 8, first, in step S200A, the RGB-XYZ converting section 9, in response to the reference achromatic color signals (Rbs, Gbs and Bbs) and by using the equation (3) in FIG. 15 containing the equation expressing the monitor profile, produces reference achromatic color XYZ data (Xbs, Ybs and Zbs) being data obtained by expressing the reference achromatic color signals (Rbs, Gbs and Bbs) by the XYZ colorimetric system.

Next, in Step S200B, the displaying RGB signal calculating section 11 first calculates CIE XYZ values (Xout, Yout and Zout) required for obtaining RGB signals (Rout, Gout and Zout) to be output to the monitor 50, by using the spectral distribution data s(λ) produced by the spectral distribution data producing section 4, correction parameters (Xs, Ys and Zs) stored in the estimated XYZ value storing section 6 and the reference achromatic color XYZ data (Xbs, Ybs and Zbs) stored in the reference achromatic color XYZ value storing section 10. That is, the spectral distribution data s(λ)is calculated by using the equation (6) in FIG. 15.

As shown in the equation (6) of FIG. 15, spectral distribution data s(λ) is obtained by adding products produced by multiplying the spectral distribution main-component data ts1(λ), ts2(λ) and ts3(λ) stored in the spectral distribution main-component storing section 1, respectively, by weighing coefficients t1, t2 and t3 stored in the weighing each of coefficient storing section 3. The correction parameters are calculated by the estimated XYZ value calculating section 5 using the equation (11) in FIG. 16. Here, s(λ) is the spectral distribution data described above. The correction coefficients are stored in the estimated XYZ value storing section 6. The CIE XYZ values (Xout, Yout and Zout) are obtained using the equation (4) in FIG. 15. Here, Xbs, Ybs and Zbs are the reference achromatic color XYZ data and Ref represents reflectance on a surface of the monitor.

Next, the displaying RGB signal calculating section 11 calculates the RGB signals (Rout, Gout and Bout) using the equation (5) in FIG. 15 containing the equation expressing the monitor profile. Here, Xout, Yout and Zout are the CIE XYZ values described above.

The displaying RGB signal calculating section 11 outputs the calculated RGB signals (Rout, Gout and Bout) to the monitor 50. Finally, in Step S200C, the monitor 50 displays colors expressed by the reference achromatic color signals defined by the RGB signals (Rout, Gout and Bout) output from the displaying RGB signal calculating section 11. Moreover, the displaying RGB signal calculating section 11, since the above display is an initial displaying, it is preferable that the predetermined RGB signals (Rout, Gout and Bout) for initial displaying, instead of the RGB signals (Rout, Gout and Bout) obtained by using the above equations, is output. This enables the avoidance of defective conditions attributable to non-input of, for example, weighing coefficients (t1, t2 and t3).

Figure 9:
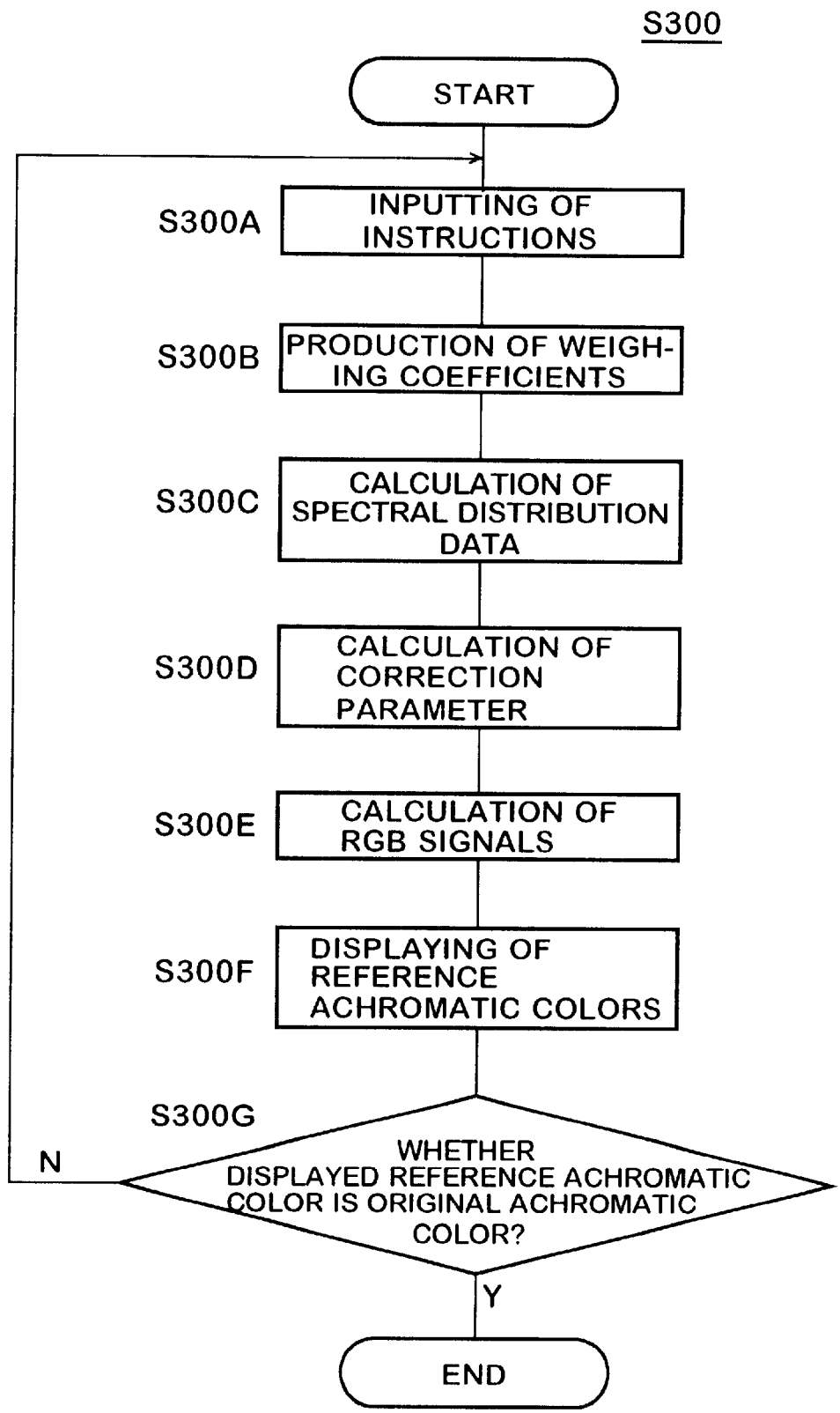
FIG. 9 shows detailed procedures for calibration of weighing coefficients by an input section explained in the flowchart of FIG. 6.

FIG. 9 shows detailed procedures for calibration of weighing coefficients by the input section 30 explained in the flowchart of FIG. 6. As shown in FIG. 9, in Step S300A, an instruction required for determining the weighing coefficients is provided by the user through the input section 30. That is, in FIG. 11, a main calibration to input information required for determining the weighing coefficient t1 is performed by moving the knob 36a along a slot 35a while referring to a scale 37a so as to be positionally adjusted. Similarly, a sub-calibration to input information required for determining the weighing coefficient t2 is performed by moving the knob 36b along a slot 35b while referring to a scale 37b so as to be positionally adjusted and a fine-calibration to input information required for determining the weighing coefficient t3 is performed by moving the knob 36c along a slot 35c while referring to a scale 37c so as to be positionally adjusted.

Next, in Step S300B, the parameter converting section 2 produces weighing coefficients (t1, t2 and t3) corresponding to the input instruction and the weighing coefficient storing section 3 stores the produced weighing coefficients (t1, t2 and t3). In Step S300C, the spectral distribution data producing section 4 calculates the spectral distribution data s($\lambda$)using the equation (6) in FIG. 15 which contains the weighing coefficients (t1, t2 and 3t) stored in the weighing coefficient storing section 3 and the spectral distribution main-component data ts1($\lambda$),ts2($\lambda$)and ts3($\lambda$)stored in the spectral distribution main-component storing section 1, as described above.

Then, in Step S300D, the estimated XYZ value calculating section 5 calculates the correction parameters (Xs, Ys and Zs) using the equation (11) in FIG. 16 and the estimated VYZ value storing section 6 stores the calculated correction parameters (Xs, Ys and Zs).

In Step S300E, the displaying RGB signal calculating section 11 calculates the RGB signals (Rout, Gout and Bout) being outputs to the monitor by using the equations (4) and (5) in FIG. 15 and outputs the calculated RGB signals (Rout, Gout and Bout) to express reference achromatic colors to the monitor 50. In Step S300F, the monitor 50 displays the reference achromatic colors in response to the calculated RGB signals (Rout, Gout and Bout).

In Step S300G, the user, when the reference achromatic colors are displayed on the monitor 50, judges whether the reference achromatic color displayed on the monitor 50 is an original achromatic color, that is, an original gray or not. If the user judges that it is the original achromatic color, the user inputs the result, which causes the routine to return to Step S300A. When the routine has returned to the Step S300A, the user provides through the input section 30 instructions required for determining weighing coefficients being different from the above weighing coefficients. In Step S300B, the parameter converting section 2, when the instruction is input, produces weighing coefficients (t1, t2 and t3) in accordance with new instruction in the same manner as above. Then, new correction parameters (Xs, Ys and Zs) are produced through procedures in Step S300C and S300D. On the other hand, when the user judges that the displayed reference achromatic color is the original achromatic color, the result is input, which causes the weighing coefficients (t1, t2 and t3) produced in Step S300B to be finally determined.

Figure 10:
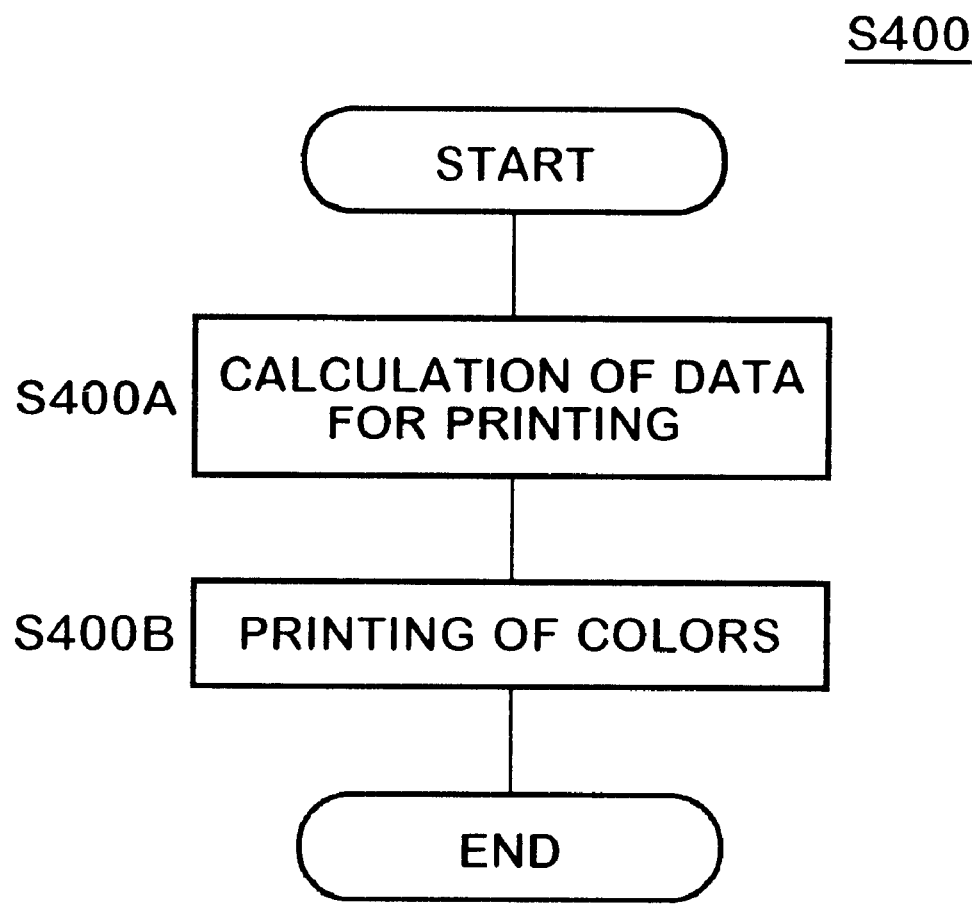
FIG. 10 shows detailed procedures for printing on a printer explained in the flowchart of FIG. 6.

FIG. 10 shows detailed procedures for the printing on the printer 60 explained in the flowchart of FIG. 6. As shown in FIG. 10, in Step S400A, the observation ambient illuminant chromaticity calculating section 12 calculates data for printing by using the equation (7) in FIG. 16 containing the correction parameters (Xs, Ys and Zs) stored in the estimated XYZ value storing section 6. Here, "Xm, Ym and Zm" represent main components of the illuminant used when the printer profile is created.

Then, in Step S400B, after the above data for printing is calculated, the printer 60 prints colors based on the obtained data.

Figure 11:
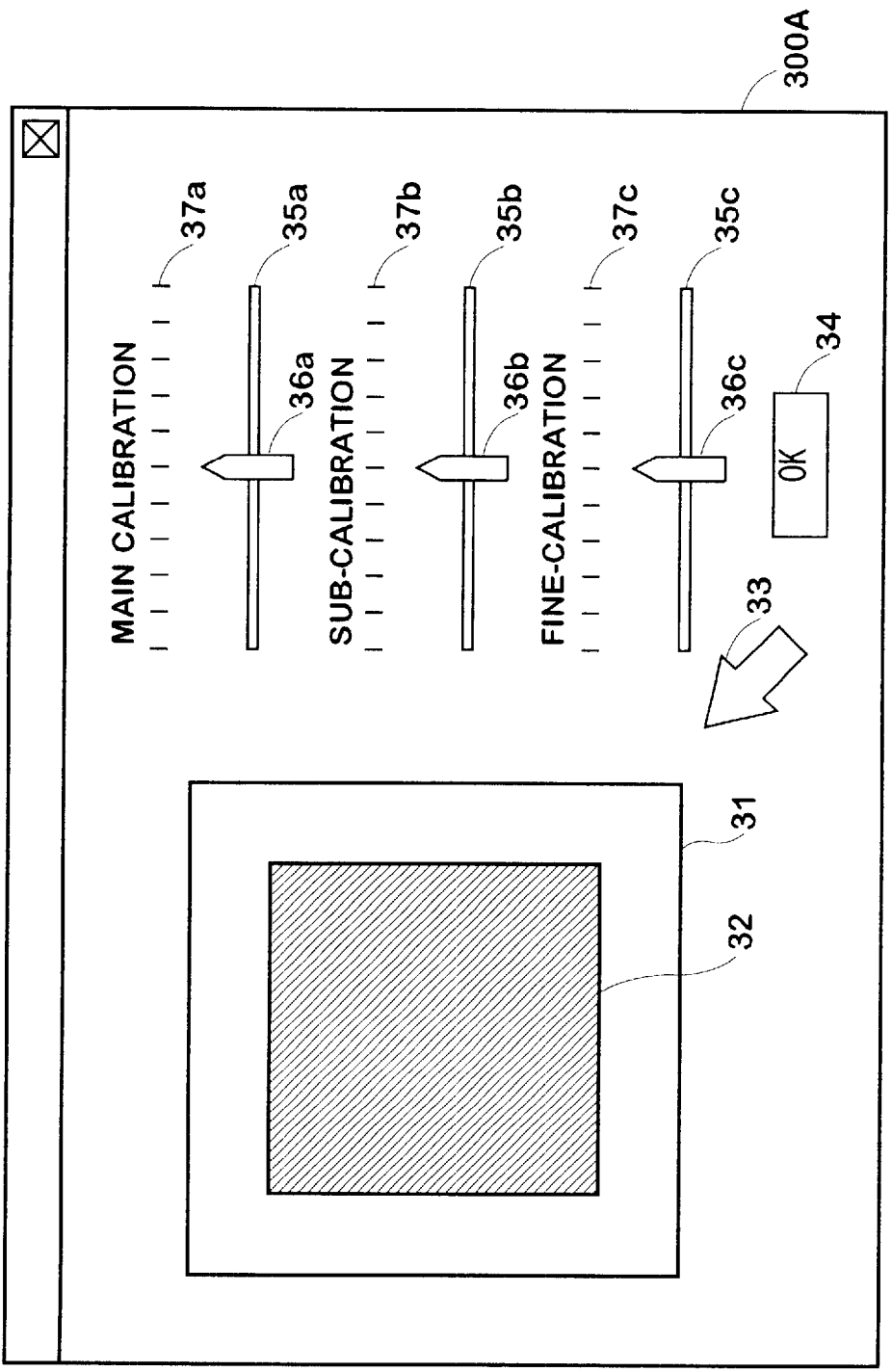
FIG. 11 shows a window displayed on the monitor according to the first embodiment of the present invention.

Next, operations of a user interface used to determine weighing coefficients calibrated by the input section 30 explained in FIG. 9 will be described below. FIG. 11 shows a window displayed on the monitor according to the first embodiment. When instructions for producing weighing coefficients are input by the user, the reference achromatic color, that is, the gray color is first displayed in a specified region 32 of the window 300A shown in FIG. 11 and then instructions are input by manipulation of knobs 36a to 36c mounted on the input section 30. This enables the user to input instructions for producing the weighing coefficients while seeing the reference achromatic color changing every time the correction parameters change. Therefore, it is made possible to immediately judge, from the reference achromatic color displayed on the window, whether the input instruction is proper or not, whenever instructions for producing weighing coefficients are input. Thus, by using the user interface, time required for determining the coefficient can be shortened.

Figure 12:
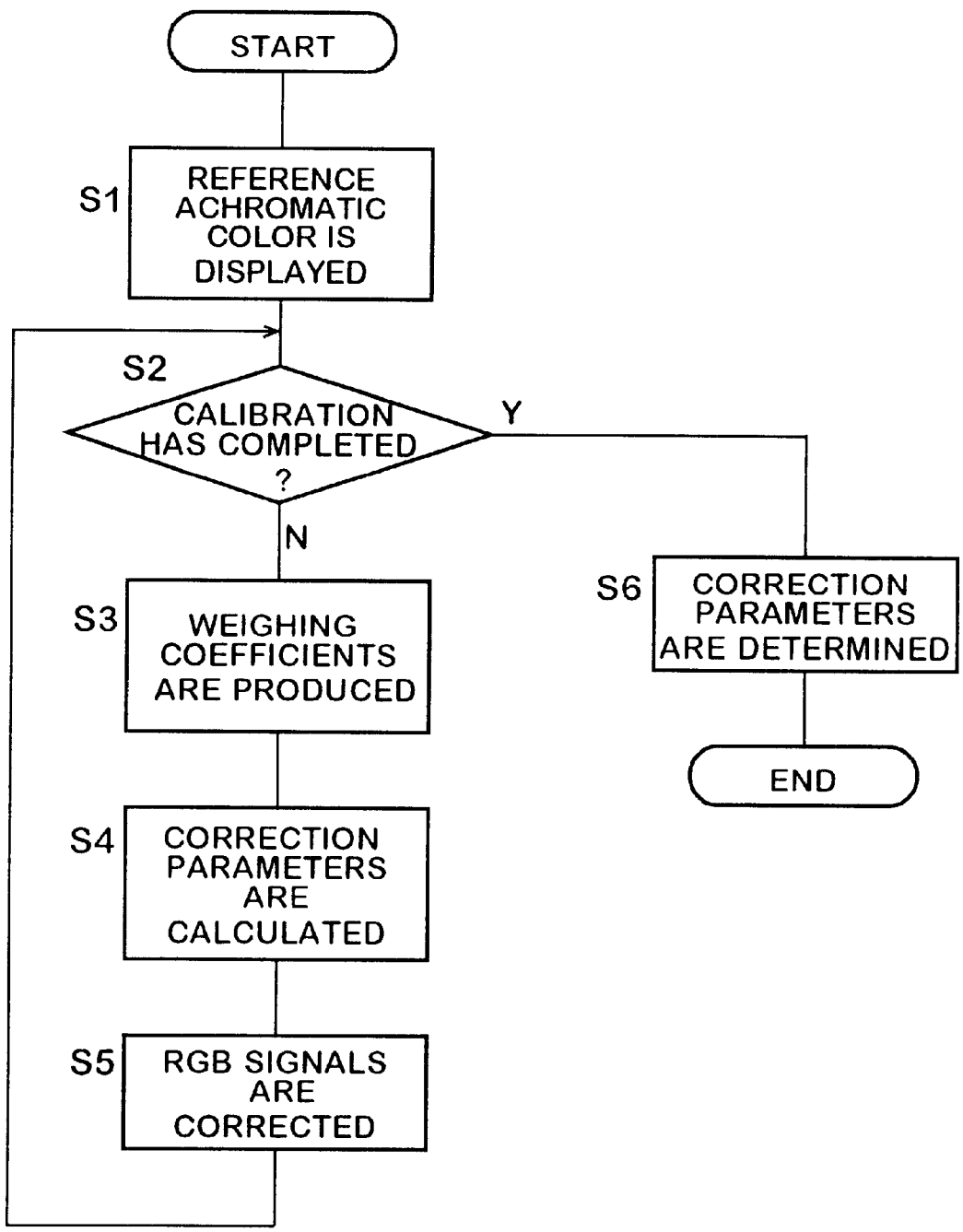
FIG. 12 is a flowchart explaining procedures for determining correction parameters according to the first embodiment of the present invention.

FIG. 12 is a flowchart explaining procedures for determining correction parameters according to the first embodiment. As shown in FIG. 12, the window 300A is first displayed on the monitor 50 and the achromatic color defined by the reference achromatic color signals is displayed in the specified region 32 on the windows 300A.

The reference achromatic color signal represents signals which, if each of the R, G and B colors is represented by 8 bits, causes each color to have a value of 128. The reference achromatic color signals are converted by the RGB-XYZ converting section 9 to the XYZ colorimetric system data (Xbs, Ybs and Zbs) according to the equation (3) in FIG. 15.

The converted reference achromatic color signals (Xbs, Ybs and Zbs) are corrected by the displaying RGB signal calculating section 11 based on correction parameters (Xs, Ys and Zs) corresponding to weighing coefficients (t1, t2 and t3).

In the operations of the above correction, first, the CIE XYZ values (Xout, Yout and Zout) are calculated. That is, the CIE XYZ values are obtained by using the correction parameters (Xs, Ys and Zs) stored in the estimated XYZ value storing section 6 and the reference achromatic color signals (Xbs, Ybs and Zbs) output from the reference achromatic XYZ value storing section 10.

Next, the RGB signals (Rout, Gout and Bout) to be output to the monitor 50 is calculated by referring to the monitor profile and in accordance with the equation (5) in FIG. 15.

The monitor reproduced color updating section 13 outputs the calculated RGB signals (Rout, Gout and Bout) to the monitor 50 and the monitor 50 displays the reference achromatic color defined by the RGB signals (Rout, Gout and Bout) in the specified region 32 on the window 300A.

In Step S2, the color correcting apparatus 200 checks whether the calibration has completed, that is, whether the weighing coefficient has been determined. The checking is made based on whether a cursor 33 adapted to operate in synchronization with the input section 30 has clicked an OK button 34, which shows the completion of the setting, mounted on the window 300A or not.

When the calibration has completed in Step S2, the correction parameters (Xs, Ys and Zs) calculated using the equation (11) in FIG. 16 are determined. This terminates all processing to determine the correction parameters.

On the other hand, if the calibration has not completed in step S2, the routine proceeds to step S3 in which the weighing coefficients (t1, t2 and t3) are produced in accordance with user's instructions provided through the input section 30.

The weighing coefficients (t1, t2 and t3) are produced by moving a displaying position of knobs 36a to 36c corresponding, respectively, to the spectral distribution main-component data $ts1(\lambda), ts2(\lambda)$ and $ts3(\lambda)$ on the window 300A, in which the calculation is performed by the parameter converting section 2. The displaying position of knobs 36a to 36c are moved by the cursor 33.

After the weighing coefficients (t1, t2 and t3) have been calculated, in Step S4, the spectral distribution data $s(\lambda)$ showing wavelength distribution of light from the illuminant is calculated using the equation (6) in FIG. 15 based on the weighing coefficients (t1, t2 and t3) fed through the weighing coefficient storing section 3 from the parameter converting section 2 and on the spectral distribution main-component data $ts1(\lambda), ts2(\lambda)$ and $ts3(\lambda)$.

Then, the correction parameters (Xs, Ys and Zs) are calculated by the estimated XYZ value calculating section 5 using the equation (11) in FIG. 16 based on the spectral distribution data $s(\lambda)$ and are stored in the estimated XYZ value storing section 6.

After the correction parameters (Xs, Ys and Zs) have been calculated, in Step S5, the CIE XYZ values (Xout, Yout and Zout) required for obtaining the RGB signals (Rout, Gout and Bout) to be output to the monitor are calculated by the displaying RGB signal calculating section 11 using the equation (4) in FIG. 15 based on the correction parameters (Xs, Ys and Zs) and the reference achromatic color XYZ (Xbs, Ybs and Zbs). Moreover, the RGB signals (Rout, Gout and Bout) are calculated by the displaying RGB signal calculating section 11.

The corrected reference achromatic color signals are fed through the monitor reproduced color updating section 13 to the monitor 50. This causes the reference achromatic color which has been corrected by correction parameters (Xs, Ys and Zs) defined by the weighing coefficients (t1, t2 and t3) to be displayed in the specified region 32 on the window 300A.

Thus, in the image processing device of the first embodiment of the present invention, by determining the weighing coefficients so that the color defined by the reference achromatic signals looks achromatic on the monitor 50 in an ambient light, the color defined by the color data corrected using the correction parameters calculated based on the weighing coefficients and to be printed on the printer can avoid an influence by differences in the ambient light which the monitor and the printer receive. That is, since the influence by the ambient light can be cancelled out by the correction using the correction parameters, whatever kind of light from the illuminant the ambient light contains, it is possible to faithfully reproduce the color being approximate to its original color on the printer.

Second Embodiment

Figure 13:
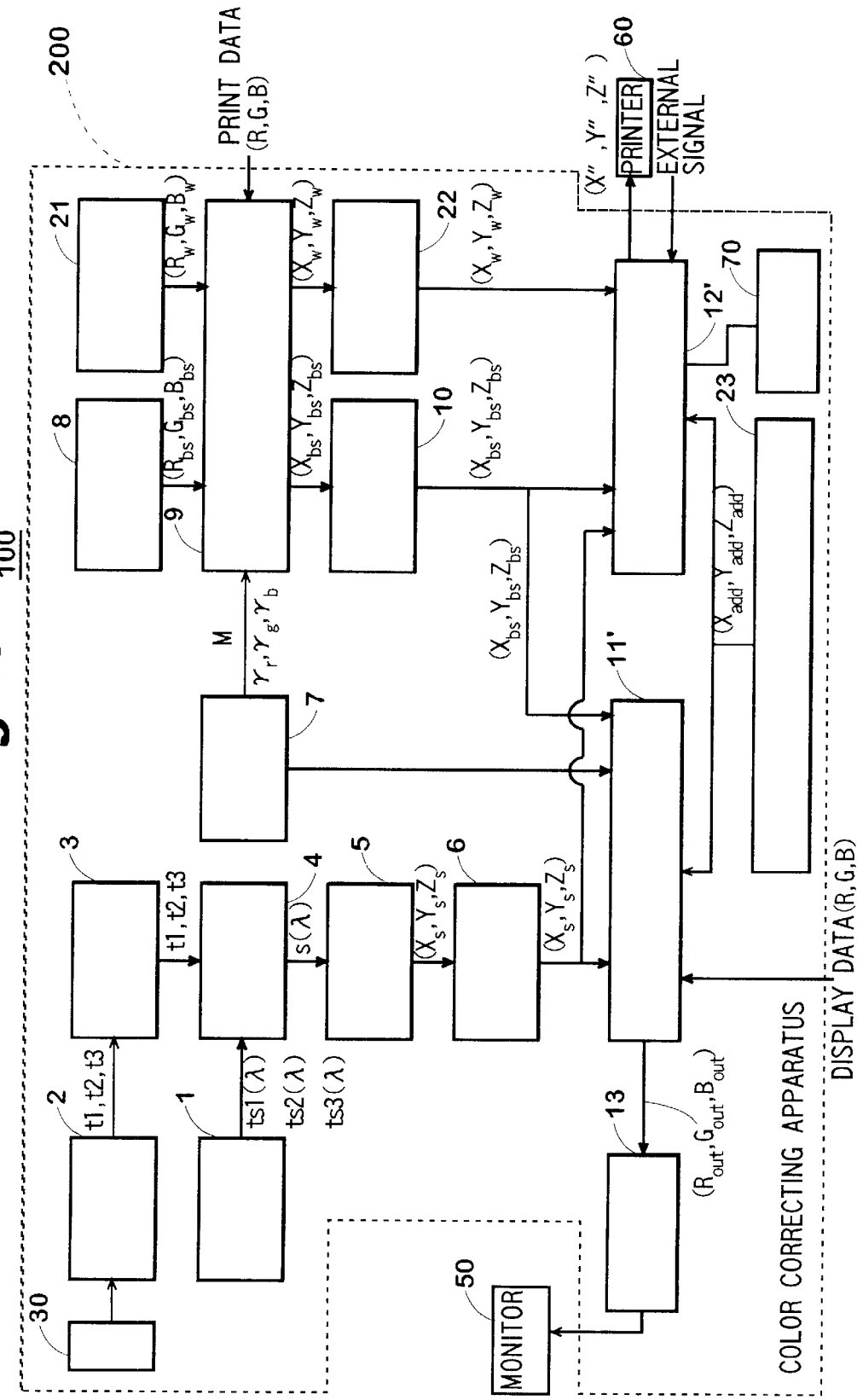
FIG. 13 is a schematic block diagram of an image processing device according to a second embodiment of the present invention.

An image processing device of a second embodiment will be described below with reference to FIG. 13. FIG. 13 is a schematic block diagram of the image processing device according to the second embodiment of the present invention. The image processing device of the second embodiment, as in the first embodiment, is provided with a color correcting apparatus 200, a monitor 50 and a printer 60.

In the image processing device of the first embodiment, the reference signals used when the user judges whether the weighing coefficients (t1, t2 and t3) are good or not are signals to express a pure achromatic color, that is, gray color. In contrast, in the image processing device of the second embodiment, the used signals do not express the pure achromatic color, but a hue, that is, a color containing a chromatic color.

That is, though, in the first embodiment, only one gray color is used as the reference color, in the second embodiment, one or more than two reference colors are used and each of the reference colors is not the pure achromatic color, but an achromatic color containing the hue. By using, at least, two or more reference colors, errors in the correction can be more reduced statistically compared with the case of the first embodiment.

In the second embodiment, if one reference color is used, a reddish gray color is displayed on the monitor 50 in the ambient light having a yellowish color and calibration is made by the user so that the reddish gray looks purely gray. Moreover, if two reference colors are used, a reddish gray color and yellowish gray color are displayed on the monitor 50 in the ambient light having the yellowish color and the calibration is made by the user so that the reddish gray and yellowish gray colors look purely gray. Thus, by using the two or more reference colors, errors in color correction can be reduced.

As shown in FIG. 13, configurations of the image processing device 100 of the second embodiment are almost the same as those in the first embodiment, however, a monitor white RGB signal storing section 21, a monitor white XYZ value storing section 22 and a secondary factor XYZ value processing section 23 are additionally provided on the image processing device 100 of the second embodiment.

The monitor white RGB signal storing section 21 stores a reference white color signal. The monitor white XYZ value storing section 22 stores the reference white color signals whose colorimetric system has been converted to the XYZ calorimetric system. Each of colors expressed by the reference white color signals, if each of the R, G and B colors are represented by 8 bits, has a value of 255, unlike the reference achromatic color signals in the first embodiment.

The secondary factor XYZ value processing section 23, by using the equation (8) in FIG. 15 in which offset values (Xadd, Yadd and Zadd) used so that the color displayed in the specified region 32 on the monitor 50 shown in FIG. 11 becomes a color being far by a specified distance from the reference color, that is, being far by offset values, are introduced, calculates the XYZ values (Xt, Yt and Zt) of the two or more reference colors.

Figure 14:
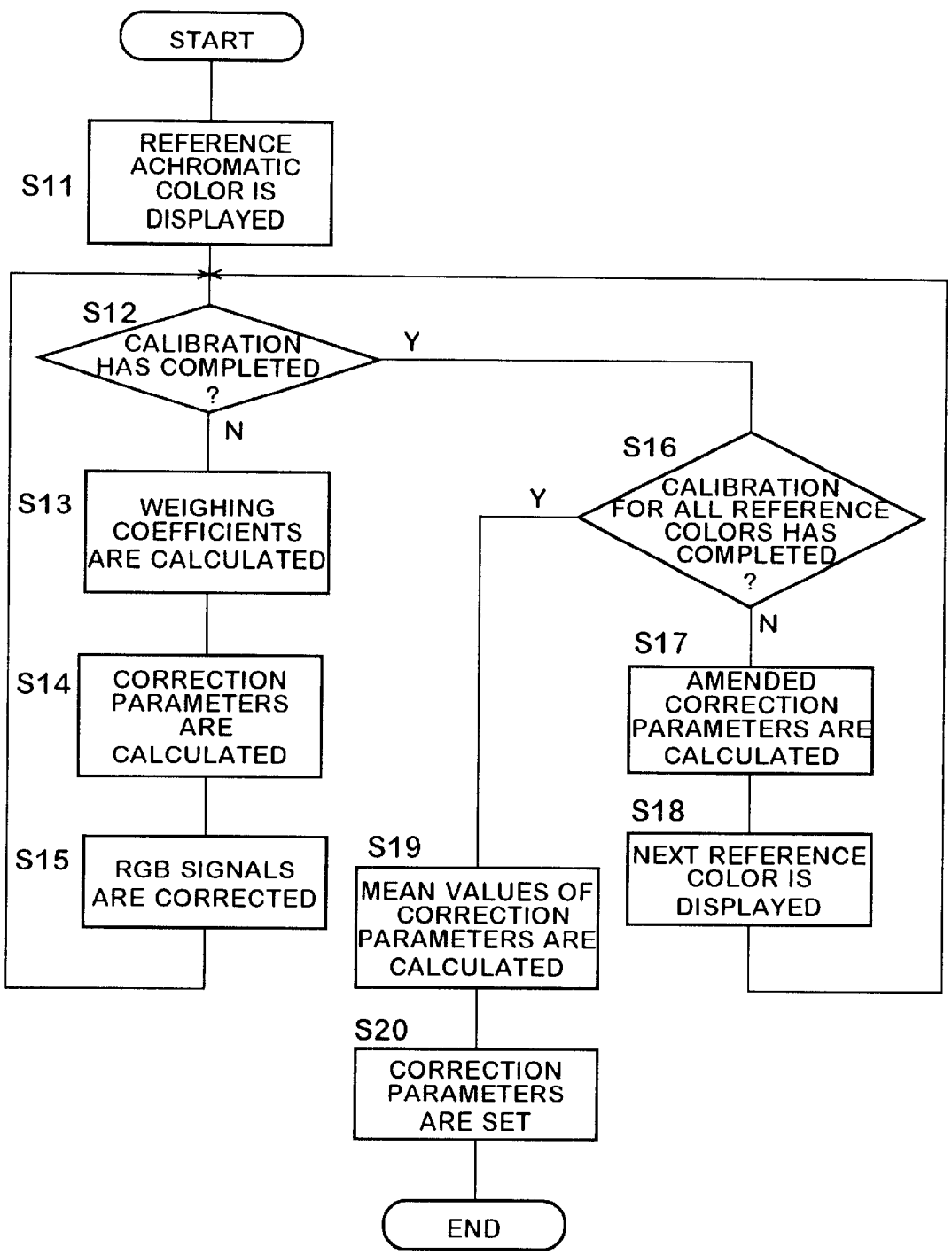
FIG. 14 is a flowchart explaining operations of the image processing device according to the second embodiment of the present invention.

FIG. 14 is a flowchart explaining operations of the image processing device according to the second embodiment of the present invention. In FIG. 14, procedures in Step S11 to S15 are the same as in Step S12 to S5 in FIG. 12. When the calibration has completed in Step S12, in Step S16, whether the calibration of all reference colors has completed or not, that is, whether setting of the correction parameters has completed or not, is judged. When it is judged that the calibration of all reference colors has completed, in Step S17, amended correction parameters (Xs', Ys' and Zs') being values obtained by subtracting the offset values from the correction parameters (Xs, Ys and Zs) are calculated by using the equation (9) in FIG. 16.

In Step S18, the offset values corresponding to next reference colors are read and the amended correction parameters (Xs', Ys' and Zs') of the next reference color are calculated using the equation (8) in FIG. 16. Then, the routine returns to Step S12 and, in Step S14, correction parameters corresponding to the reference colors are calculated.

After the calculation of the correction parameters (Xs, Ys and Zs) for all reference colors has completed, that is, the calculation of the amended correction parameters (Xs', Ys' and Zs') corresponding to all reference colors has completed, in Step S19, mean values of the amended correction parameters (Xs', Ys' and Zs') calculated for the reference achromatic color and the reference color are calculated and, in Step S20, the mean values are stored as correction parameters having functions as in the case of the first embodiment.

The stored correction parameters are used when the displaying RGB signal calculating section 11' corrects colors of displayed images or when the observation ambient illuminant chromaticity calculating section 12' calculates observation ambient illuminant chromaticity (xvi and yvi) for printing images at a time of displaying on the monitor 50 and of printing on the printer 60. The observation ambient illuminant chromaticity (xvi and yvi) are calculating using the equation (10) in FIG. 16.

The printer 60 prints the color corrected depending on light emitted from the ambient illuminant, based on the observation ambient illuminant chromaticity (xvi and yvi).

Thus, according to the image processing device of the second embodiment, as in the first embodiment, the color reproduced faithfully from its original color and therefore being approximate to the original color can be printed on the printer. Moreover, since the correction parameters (Xs, Ys and Zs) are determined by setting the weighing coefficients so that two or more different reference colors look achromatic, errors in the estimation, that is, in the reproduction of the wavelength distribution of light emitted from the illuminant can be statistically reduced more when compared with the case in the first embodiment, thus enabling the color reproduced more faithfully from its original color to be printed on the printer.

As described above, according to the color correcting apparatus of the present invention, since the color data is corrected, to reproduce the second ambient light, in which the output device is placed, having the wavelength distribution being different from that of the first ambient light in which the color data is set, based on the correction parameters obtained using two or more pieces of main component data each representing component of different light and using two or more weighing coefficients to assign weight to each of the two or more pieces of main component data, the color output based on the corrected color data by the output device in the second ambient light is made more approximate to the color obtained in the first ambient light.

It is thus apparent that the present invention is not limited to the above embodiments but may be changed and modified without departing from the scope and spirit of the invention.

What is claimed is:

1. A color correcting apparatus that, to allow an output device that outputs a first color based on first color data calibrated to output said first color in first ambient light, to output a second color substantially the same as said first color in second ambient light having wavelength distribution or chromaticity coordinates different from that of said first ambient light, corrects said first color data according to said second ambient light, the color correcting apparatus comprising:

a storing section that stores two or more pieces of main component data each representing a different component of light, said main component data being combined to reproduce said second ambient light;

an input section that inputs two or more weighing coefficients to assign weight to each of said two or more pieces of component data when said two or more pieces of main component data are combined; and a correcting section that corrects said first color data based on correction parameters obtained using said two or more pieces of component data stored in said storing section and using said two or more weighing coefficients input through said input section.

2. The color correcting apparatus according to claim 1, wherein correction parameters for use in displaying achromatic color data, are employed for said color correction in color display based on said achromatic color data using said correction parameters in said second ambient light.

3. The color correcting apparatus according to claim 2, wherein said achromatic color data is chromatic color data having a hue.

4. The color correcting apparatus according to claim 1, wherein said main component is a representative light component obtained by analysis and synthesis of two or more different kinds of ambient light.

5. The color correcting apparatus according to claim 4, wherein said main component data represents wavelength distribution of light obtained by said synthesis of said two or more kinds of ambient light.

6. The color correcting apparatus according to claim 1, further comprising a displaying section that displays the second color based on said first color data after said color data has been corrected by said correcting section in order to obtain said correction parameters required for correcting according to said second ambient light.

7. The color correcting apparatus according to claim 6, wherein said displaying section is a section on which a color is displayed by either an RGB (Red, Green and Blue) colorimetric system or a CMY (Cyan, Magenta and Yellow) colorimetric system.

8. The color correcting apparatus according to claim 7, wherein said displaying section in which a color is displayed by said RGB colorimetric system is a monitor and said displaying section in which said color is displayed by said CMY colorimetric system is a printer.

9. The color correcting apparatus according to claim 1, wherein said displaying section displays color by either using a process of additive mixture of color stimuli or using a process of subtractive mixture of color stimuli.

10. The color correcting apparatus according to claim 1, wherein said output device is a displaying section on which a color is displayed by either an RGB colorimetric system or a CMY colorimetric system.

11. The color correcting apparatus according to claim 10, wherein said displaying section in which a color is displayed by said RGB colorimetric system is a monitor and said displaying section in which said color is displayed by said CMY calorimetric system is a printer.

12. The color correcting apparatus according to claim 1, further comprising a calibrating section that calibrates a color based on said color data corrected by said correcting section in order to obtain said correction parameters required for correcting said second ambient light.

13. The color correcting apparatus according to claim 1, wherein said output device is an output device that outputs the first and second colors by either using a process of additive mixture of color stimuli or using a process of subtractive mixture of color stimuli.

* * * * *